2,943,107
PROCESS OF PREPARING TRIBUTYL PHOSPHOROTRITHIOATE

Kenneth H. Rattenbury, Kansas City, Mo., and James R. Costello, Prairie Village, Kans., assignors to Chemagro Corporation, New York, N.Y., a corporation of New York No Drawing. Filed Nov. 19, 1959, Ser. No. 853,994

8 Claims. (Cl. 260—461)

This invention relates to the preparation of S,S,S-tributyl phosphorotrithioate.

It has been proposed in Crouch Patent No. 2,682,554 to prepare S,S,S-tributyl phosphorotrithioate by reacting one mol of phosphorus trichloride with at least 4 mols, and preferably 5 mols, of n-butyl mercaptan to form S,S,S-tributyl trithiophosphite. This process has the disadvantage that considerable amounts of excess mercaptan must be recovered prior to the oxidation step.

It has also been proposed to utilize only the theoretical amount of butyl mercaptan in preparing the tributyl trithiophosphite, Lippert "Journal American Chemical Society," vol. 60, pages 2370-2371. However, this process has the disadvantage that the yields are relatively low, e.g., 58%, since the reaction does not go to completion.

It is an object of the present invention to prepare S,S,S-tributyl phosphorotrithioate by a novel and improved procedure.

Another object is to cut down or eliminate the excess of butyl mercaptan when reacting it with phosphorus trichloride in preparing S,S,S-tributyl phosphorotrithioate.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting one mol of phosphorus trichloride with 3 to 3.3 mols of tributyl mercaptan, allowing the reaction to go 85%, and preferably 90%, to completion and then adding an oxidizing agent to oxidize the tributyl trithiophosphite to S,S,S-tributyl phosphorotrithioate. The overall reaction can be expressed as follows:

$$PCl_3 + 3C_4H_9SH \rightarrow (C_4H_9S)_3P + 3HCl$$

$$(C_4H_9S)_3P + [O] \rightarrow (C_4H_9S)_3PO$$

Actually, however, the reaction is not that simple. The reaction of phosphorus trichloride with butyl mercaptan to form S,S,S-tributyl trithiophosphite is an equilibrium which is irreversible with respect to butyl mercaptan and hydrogen chloride but reversible with respect to phosphorus trichloride. The following reactions are proceeding (1) $PCl_3 + C_4H_9SH \rightarrow C_4H_9SPCl_2 + HCl\uparrow$ (2) $C_4H_9SPCl_2 + C_4H_9SH \rightarrow (C_4H_9S)_2PCl + HCl\uparrow$ (3) $(C_4H_9S)_2PCl + C_4H_9SH \rightarrow (C_4H_9S)_3P + HCl\uparrow$ while at the same time the following competing reactions are preventing the reaction from going to completion (4) $2(C_4H_9S)_3P + PCl_3 \rightarrow 3(C_4H_9S)_2PCl$ (5) $(C_4H_9S)_2PCl + PCl_3 \rightarrow 2C_4H_9SPCl_2$ (6) $(C_4H_9S)_3P + C_4H_9SPCl_2 \rightarrow 2(C_4H_9S)_2PCl$ When utilizing essentially theoretical quantities of butyl mercaptan to phosphorus trichloride (3.09 mols to 1 in a specific example) the reaction to form tributyl trithiophosphite was found to be 50% complete at 35° C., 75% complete at 100° C. and 90-95% complete at 150° C. (reflux temperature).

According to the present invention, the equilibrium is forced to completion by oxidizing the tributyl trithiophosphite to form S,S,S-tributyl phosphorotrithioate. It has been found that the tributyl trithiophosphite is oxidized at a faster rate than its intermediates and, hence, the desired phosphorotrithioate is formed. The primary reaction should be at least 85% and preferably 90% complete in order for best results to be achieved in the subsequent oxidation. Lower conversions favor the oxidation of $C_4H_9SPCl_2$ and $(C_4H_9S)_2PCl$ which then serve as oxidation inhibitors.

While the preferred oxidizing agent is air, there can also be used oxygen, ozone, hydrogen peroxide, persulfates, chlorine water.

In a series of runs, the overall yields of S,S,S-tributyl phosphorotrithioate based on the phosphorus trichloride ranged from 82 to 85%. If the impurities are removed prior to oxidation, the yield is only 74-76%.

Unless otherwise stated, all parts and percentages are by weight.

Example

To a 3 necked 500 cc. flask equipped with stirrer, thermometer, dropping funnel, condenser and a HCl absorption trap were added 278.1 grams of n-butyl mercaptan (97% pure; 3.0 mols) and the flask heated to 35° C. Then 137.4 grams of phosphorus trichloride (1.0 mol) was added over a period of 4 hours while maintaining the temperature at 35±5° C. Mild heating was required to maintain this temperature. The material in the flask was then heated to 150° C. over a period of 2 hours and held at 150° C. for 0.5 hour.

The dropping funnel was replaced by a gas diffusion tube and the material in the flask cooled to 110° C. Air was then diffused into the reactor at a rate of 600 cc./min. while maintaining the temperature at 110±2° C. Initially air cooling was required but in the latter stages of the reaction heat was applied. The reaction was continued until it was no longer exothermic, about 2 hours. During the reaction the butyl mercaptan is refluxed back to the system.

Boiling water is added to the product which is agitated for 15 minutes at 95-100° C. and then allowed to settle for 5 minutes and the layers allowed to separate. The aqueous layer which contains phosphoric acid is drawn off and discarded. The product is blown dry with air at 100-110° C. and any excess mercaptan present recovered by condensation into a receiver.

The final product contained 258.0 grams (82% yield) of S,S,S-tributyl phosphorotrithioate.

What is claimed is:

1. A process of preparing S,S,S-tributyl phosphorotrithioate comprising reacting 3 to 3.3 mols of butyl mercaptan with 1 mol of phosphorus trichloride until the reaction to form S,S,S-tributyl trithiophosphite is 85 to 95% complete and then oxidizing the reaction mixture to form S,S,S-tributyl phosphorotrithioate.

2. A process according to claim 1 wherein the oxidizing agent is air.

3. A process according to claim 1 wherein the reaction with the butyl mercaptan is taken to 90% of completion.

4. A process according to claim 1 wherein the reaction with butyl mercaptan is carried out at about 150° C. until the reaction is 90 to 95% complete.

5. A process according to claim 4 wherein the oxidizing agent is air.

6. A process according to claim 1 wherein the oxidizing agent is an oxygen containing gas.

7. A process according to claim 6 wherein there is utilized 3 mols of butyl mercaptan, and the reaction with the butyl mercaptan is taken to 90% completion at a temperature of 150° C.

8. A process according to claim 7 wherein the oxidation is carried out at 110° C.

No references cited.